United States Patent
Li et al.

(10) Patent No.: US 12,345,651 B2
(45) Date of Patent: Jul. 1, 2025

(54) GAS CHROMATOGRAPHIC COMPONENT ANALYSIS SYSTEM AND COMPONENT DETECTOR INCLUDING AN OXIDATION-REDUCTION FURNACE, REACTION CELL AND PHOTODETECTOR

(71) Applicant: SHIMADZU CORPORATION, Kyoto (JP)

(72) Inventors: Sixu Li, Kyoto (JP); Masaru Kozakura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 114 days.

(21) Appl. No.: 17/298,301

(22) PCT Filed: Jan. 29, 2019

(86) PCT No.: PCT/JP2019/002999
§ 371 (c)(1),
(2) Date: May 28, 2021

(87) PCT Pub. No.: WO2020/121539
PCT Pub. Date: Jun. 18, 2020

(65) Prior Publication Data
US 2022/0026406 A1  Jan. 27, 2022

(30) Foreign Application Priority Data
Dec. 12, 2018 (WO) .................. PCT/JP2018/045623

(51) Int. Cl.
*G01N 21/76* (2006.01)
*B01D 53/02* (2006.01)
(Continued)

(52) U.S. Cl.
CPC .......... *G01N 21/766* (2013.01); *B01D 53/025* (2013.01); *G01N 30/06* (2013.01); *G01N 30/74* (2013.01)

(58) Field of Classification Search
CPC ...... G01N 21/766; G01N 30/06; G01N 30/74; B01D 53/025
(Continued)

(56) References Cited

U.S. PATENT DOCUMENTS 1,984,933 A  12/1934  Kuenhold
2,000,119 A  5/1935  Brown et al.
(Continued)

FOREIGN PATENT DOCUMENTS

CN   201173899 Y  * 12/2008
JP   57110961 A   *  7/1982
(Continued)

OTHER PUBLICATIONS

Shi, H. et al, Journal of Chromatography A 1997, 779, 307-313 (Year: 1997).*
(Continued)

*Primary Examiner* — Arlen Soderquist
(74) *Attorney, Agent, or Firm* — Sughrue Mion, PLLC

(57) ABSTRACT

A component analysis system includes a gas chromatograph having a separation column, and a component detector, the component detector including an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, a photodetector that detects light
(Continued)

generated in the reaction cell, and a holding member that holds the oxidation-reduction furnace and the reaction cell, and a downstream end of the first flow path and the inlet of the reaction cell are directly connected or connected via a second flow path.

8 Claims, 8 Drawing Sheets

(51) Int. Cl.
    *G01N 30/06*     (2006.01)
    *G01N 30/74*     (2006.01)

(58) Field of Classification Search
    USPC .......... 422/79–80, 94, 89; 436/119–121, 172
    See application file for complete search history.

(56) References Cited

U.S. PATENT DOCUMENTS

| | | | |
|---|---|---|---|
| 2,060,599 A | 11/1936 | Van Seggern | |
| 2,147,606 A * | 2/1939 | McMillan | G01N 7/00 |
| | | | 436/148 |
| 3,399,038 A | 8/1968 | Maurice et al. | |
| 3,403,545 A * | 10/1968 | Carter | G01N 30/30 |
| | | | 73/23.25 |
| 3,527,567 A | 9/1970 | Philyaw et al. | |
| 3,698,869 A * | 10/1972 | Condon | G01N 27/16 |
| | | | 436/115 |
| 3,703,355 A | 11/1972 | Takahashi | |
| 3,749,929 A * | 7/1973 | Wooten | G01N 21/766 |
| | | | 436/118 |
| 3,819,499 A | 6/1974 | Hoogeveen et al. | |
| 3,848,128 A * | 11/1974 | McMillan, Jr. | G01N 33/0013 |
| | | | 250/361 C |
| 3,861,874 A | 1/1975 | Krc | |
| 3,877,875 A | 4/1975 | Jones et al. | |
| 3,898,041 A | 8/1975 | Stephens et al. | |
| 3,904,371 A * | 9/1975 | Neti | G01N 31/00 |
| | | | 423/403 |
| 4,018,562 A | 4/1977 | Parks et al. | |
| 4,044,593 A * | 8/1977 | Haruki | G01N 30/30 |
| | | | 392/394 |
| 4,054,414 A | 10/1977 | Grob et al. | |
| 4,066,409 A * | 1/1978 | Fine | G01N 31/005 |
| | | | 436/160 |
| 4,066,411 A | 1/1978 | Fine et al. | |
| 4,070,155 A * | 1/1978 | Fraim | G01N 31/005 |
| | | | 436/114 |
| 4,087,249 A | 5/1978 | Okumoto et al. | |
| 4,118,193 A * | 10/1978 | Neti | G01N 31/12 |
| | | | 422/54 |
| 4,193,963 A * | 3/1980 | Bruening | G01N 21/766 |
| | | | 422/89 |
| 4,227,887 A * | 10/1980 | Takahashi | G01N 33/1826 |
| | | | 436/154 |
| 4,244,917 A * | 1/1981 | Woods | G01N 31/12 |
| | | | 432/198 |
| 4,301,114 A | 11/1981 | Rounbehler et al. | |
| 4,333,735 A * | 6/1982 | Hardy | G01N 21/766 |
| | | | 422/78 |
| 4,409,336 A * | 10/1983 | Oita | G01N 31/12 |
| | | | 205/785.5 |
| 4,569,918 A | 2/1986 | Moore et al. | |
| 4,587,835 A * | 5/1986 | Adams | G01N 30/74 |
| | | | 250/343 |
| 4,599,218 A * | 7/1986 | Demaison | G01N 1/2294 |
| | | | 422/89 |
| 4,710,354 A * | 12/1987 | Behar | G01N 1/4022 |
| | | | 422/78 |
| 4,778,764 A * | 10/1988 | Fine | G01N 31/12 |
| | | | 422/89 |
| 4,843,016 A | 6/1989 | Fine | |
| 4,851,683 A * | 7/1989 | Yang | G01N 21/73 |
| | | | 250/340 |
| 4,916,077 A * | 4/1990 | Forster | G01N 31/12 |
| | | | 261/78.2 |
| 4,916,313 A * | 4/1990 | Hall | H01J 49/0009 |
| | | | 250/288 |
| 4,950,456 A * | 8/1990 | Forster | G01N 31/12 |
| | | | 261/78.2 |
| 4,970,905 A | 11/1990 | McClennen et al. | |
| 4,985,625 A * | 1/1991 | Hurst | H01J 49/0468 |
| | | | 250/281 |
| 4,985,925 A | 1/1991 | Langberg et al. | |
| 5,009,591 A | 4/1991 | Watanabe | |
| 5,012,052 A | 4/1991 | Hayes | |
| 5,242,471 A * | 9/1993 | Markham | G01N 30/462 |
| | | | 73/23.4 |
| 5,271,894 A | 12/1993 | Kozakura et al. | |
| 5,298,225 A | 3/1994 | Higdon | |
| 5,352,611 A * | 10/1994 | Fine | B29B 17/02 |
| | | | 73/23.35 |
| 5,470,754 A * | 11/1995 | Rounbehler | G01N 1/2226 |
| | | | 436/158 |
| 5,501,981 A * | 3/1996 | Ray | G01N 30/68 |
| | | | 436/119 |
| 5,614,417 A * | 3/1997 | Kubala | G01N 33/287 |
| | | | 436/119 |
| 5,766,954 A | 6/1998 | Freedman et al. | |
| 5,783,741 A | 7/1998 | Ellis et al. | |
| 5,916,523 A * | 6/1999 | Yan | G01N 21/766 |
| | | | 422/52 |
| 5,980,832 A | 11/1999 | Andresen et al. | |
| 6,057,162 A | 5/2000 | Rounbehler et al. | |
| 6,096,267 A * | 8/2000 | Kishkovich | G03F 7/70525 |
| | | | 422/62 |
| 6,207,460 B1 * | 3/2001 | Kishkovich | G01N 33/0013 |
| | | | 422/62 |
| 6,245,298 B1 | 6/2001 | Bremer et al. | |
| 6,442,995 B1 * | 9/2002 | van der Maas | G01N 30/12 |
| | | | 95/82 |
| 6,458,328 B1 * | 10/2002 | Wreyford | G01N 31/12 |
| | | | 422/89 |
| 6,511,850 B1 * | 1/2003 | Vigh | G01N 27/44717 |
| | | | 261/78.2 |
| 6,530,260 B1 * | 3/2003 | Mustacich | G01N 30/30 |
| | | | 422/89 |
| 8,378,293 B1 * | 2/2013 | Quimby | H01J 49/0027 |
| | | | 250/284 |
| 2002/0090735 A1 * | 7/2002 | Kishkovich | G03F 7/70916 |
| | | | 422/62 |
| 2003/0015019 A1 * | 1/2003 | O'Brien | G01N 1/40 |
| | | | 73/23.37 |
| 2003/0049854 A1 | 3/2003 | Rhodes | |
| 2003/0049855 A1 * | 3/2003 | Rhodes | G01N 33/0014 |
| | | | 436/117 |
| 2003/0082822 A1 * | 5/2003 | Lanier | G01N 1/2258 |
| | | | 73/23.31 |
| 2004/0126729 A1 * | 7/2004 | Hayashi | G01N 31/12 |
| | | | 432/66 |
| 2004/0151630 A1 * | 8/2004 | Hernandez, Jr. | G01N 31/12 |
| | | | 422/52 |
| 2005/0074365 A1 * | 4/2005 | Olstowski | G01N 33/287 |
| | | | 436/119 |
| 2005/0129578 A1 * | 6/2005 | Olstowski | G01N 33/2835 |
| | | | 436/160 |
| 2005/0153253 A1 * | 7/2005 | Olstowski | F23M 9/06 |
| | | | 431/76 |
| 2006/0245973 A1 * | 11/2006 | Kita | G01N 33/0013 |
| | | | 422/68.1 |
| 2006/0246594 A1 * | 11/2006 | Appel | G01N 21/6408 |
| | | | 436/81 |
| 2007/0181798 A1 * | 8/2007 | Lubkowitz | G01N 30/8675 |
| | | | 250/288 |
| 2008/0156072 A1 | 7/2008 | Smeets et al. | |
| 2008/0299670 A1 | 12/2008 | Smeets et al. | |
| 2008/0302959 A1 * | 12/2008 | Amirav | G01N 30/7206 |
| | | | 250/286 |

(56) References Cited

U.S. PATENT DOCUMENTS

| | | | | |
|---|---|---|---|---|
| 2009/0249860 | A1* | 10/2009 | Tanikawa | G01N 30/6069 73/61.55 |
| 2009/0272270 | A1* | 11/2009 | McGill | G01N 30/6095 156/278 |
| 2010/0101304 | A1 | 4/2010 | McIntyre et al. | |
| 2010/0118301 | A1* | 5/2010 | Vondras | G01N 33/0042 356/318 |
| 2010/0212398 | A1 | 8/2010 | Krummen et al. | |
| 2011/0146378 | A1* | 6/2011 | Brand | G01N 21/64 73/23.31 |
| 2012/0258857 | A1 | 10/2012 | Pham et al. | |
| 2014/0017129 | A1* | 1/2014 | Miki | G01N 33/0013 423/242.1 |
| 2014/0219868 | A1 | 8/2014 | Sasaki et al. | |
| 2016/0097747 | A1 | 4/2016 | Narukami | |
| 2017/0137285 | A1 | 5/2017 | Ide et al. | |
| 2019/0383748 | A1* | 12/2019 | Barendregt | G01N 21/766 |
| 2020/0003695 | A1 | 1/2020 | Horiike et al. | |
| 2020/0249170 | A1* | 8/2020 | Yamane | G01N 21/76 |
| 2021/0285886 | A1* | 9/2021 | Barendregt | G01N 21/766 |
| 2021/0404999 | A1* | 12/2021 | Kozakura | G01N 21/76 |
| 2022/0011237 | A1* | 1/2022 | Suzuki | G01N 21/766 |
| 2022/0026370 | A1* | 1/2022 | Suzuki | G01N 33/0073 |
| 2022/0026406 | A1 | 1/2022 | Li et al. | |

FOREIGN PATENT DOCUMENTS

| | | | | |
|---|---|---|---|---|
| JP | 60010170 | A * | 1/1985 | G01N 31/10 |
| JP | 2015-059876 | A | 3/2015 | |
| JP | 7207422 | B2 | 1/2023 | |
| WO | WO-0146683 | A2 * | 6/2001 | G01N 31/12 |
| WO | 2015/083794 | A1 | 6/2015 | |
| WO | 2018/139920 | A1 | 8/2018 | |
| WO | 2018/168599 | A1 | 9/2018 | |
| WO | 2020/110408 | A1 | 6/2020 | |
| WO | 2020/121426 | A1 | 6/2020 | |

OTHER PUBLICATIONS

Agilent 355 Sulfur and 255 Nitrogen Chemiluminescence Detectors Operation and Mantainance Manual 2012, 120 pages. (Year: 2012).*
Agilent 8355 S Sulfur and 8255 S Nitrogen Chemiluminescence Detectors User Manual 2017, 110 pages. (Year: 2017).*
Agilent Technologies, Inc., "Agilent 8355 Chemiluminescent Sulfur Detector / Agilent 8255 Chemiluminescent Nitrogen Detector" User Manual [Online], 3rd Edition, Dec. 2015, pp. 35-60, [Search Date Feb. 25, 2019] Internet : <URL:https://www.agilent.com/cs/library/usermanuals/public/Copy(4)%20of%20UserManual.pdf>.
International Search Report for PCT/JP2019/002999, dated Mar. 19, 2019.
Written Opinion for PCT/JP2019/002999, dated Mar. 19, 2019.
Office Action dated May 10, 2022 issued by the Japanese Patent in Japanese Application No. 2020-559681.
Sulfur chemical emission detector Simple instruction manual, Agilent Technologies, 2007, retrieved from the internet: < URL:https://www.chem-agilent.com/cimg/SCD.pdf> (26 pages).
Notice of Allowance dated Feb. 1, 2022 issued by the Japanese Patent Office in Japanese Application No. 2020-559595.
Written Opinion of PCT/JP2018/045623 dated Mar. 5, 2019 [PCT/ISA/237].
International Search Report of PCT/JP2018/045623 dated Mar. 5, 2019 [PCT/ISA/210].
Office Action issued Aug. 16, 2023 in Japanese Application No. 2022-206085.
Chinese Office Action dated Jan. 2, 2024 in Application No. 201880099712.X.
Chinese Office Action dated Jun. 12, 2024 in Application No. 201980081588.9.
Chinese Office Action issued Nov. 14, 2024 in Application No. 201980081588.9.
Chinese Office Action issued Sep. 27, 2024 in Application No. 201880099712.X.
Chinese Office Action dated Oct. 27, 2023 in Application No. 201980081588.9.

* cited by examiner

○ : INVENTIVE EXAMPLE (TRANSFER TUBE 55 CM)
× : COMPARATIVE EXAMPLE (TRANSFER TUBE 150 CM)

○ : INVENTIVE EXAMPLE (TRANSFER TUBE 55 CM)
× : COMPARATIVE EXAMPLE (TRANSFER TUBE 150 CM)

○ : INVENTIVE EXAMPLE (TRANSFER TUBE 55 CM)
× : COMPARATIVE EXAMPLE (TRANSFER TUBE 150 CM)

○ : INVENTIVE EXAMPLE (TRANSFER TUBE 55 CM)
× : COMPARATIVE EXAMPLE (TRANSFER TUBE 150 CM)

GAS CHROMATOGRAPHIC COMPONENT ANALYSIS SYSTEM AND COMPONENT DETECTOR INCLUDING AN OXIDATION-REDUCTION FURNACE, REACTION CELL AND PHOTODETECTOR

CROSS REFERENCE TO RELATED APPLICATIONS

This application is a National Stage of International Application No. PCT/JP2019/002999 filed Jan. 29, 2019, claiming priority based on International Patent Application No. PCT/JP2018/045623 filed Dec. 12, 2018.

TECHNICAL FIELD

The present invention relates to a component analysis system and a component detector that detect sample components.

BACKGROUND ART

A Sulfur Chemiluminescence Detector (SCD) that detects a sulfur (S) component in a sample utilizing a chemical reaction accompanied by emission of light is known (see Patent Document 1, for example).

In the SCD described in Patent Document 1, a gas including a sulfur component in a sample separated by a separation column of a gas chromatograph is oxidized and reduced by an oxidation device (oxidation-reduction furnace). Thus, sulfur monoxide (SO) is produced from the sulfur component in the sample. The produced sulfur monoxide is introduced into a reaction cell through a transfer tube from the oxidation device.

Here, the oxidation device is attached onto an upper surface of a casing of the gas chromatograph and is provided to extend upward from the upper surface. On the other hand, the reaction cell is provided at a side of the casing of the gas chromatograph. The transfer tube has a length of approximately 140 cm to 200 cm and is provided to connect an upper end of the oxidation device and the reaction cell.

In the reaction cell, ozone ($O_3$) is introduced together with the sulfur monoxide, and the sulfur monoxide and the ozone react with each other, so that an excited species of sulfur dioxide ($SO_2$) is produced. Light that is generated when the sulfur dioxide transits to a ground state is detected by a photodetector. A sulfur content in the sample is quantified based on intensity of the detected light.

[Patent Document 1] JP 2015-59876 A

SUMMARY OF THE INVENTION

Technical Problem

An object of the present invention is to provide a component analysis system and a component detector that enable detection of a sample component with high accuracy.

Solution to Problem

One aspect of the present invention relates to a component analysis system including a gas chromatograph having a separation column, and a component detector, wherein the component detector includes an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, a photodetector that detects light generated in the reaction cell, and a holding member that holds the oxidation-reduction furnace and the reaction cell, and a downstream end of the first flow path and the inlet of the reaction cell are directly connected or connected via a second flow path.

A second aspect of the present invention relates to a component detector used along with a gas chromatograph having a separation column, the component detector including an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, a photodetector that detects light generated in the reaction cell, and a holding member that holds the oxidation-reduction furnace and the reaction cell, wherein a downstream end of the first flow path and the inlet of the reaction cell are directly connected or connected via a second flow path.

A third aspect of the present invention relates to a component analysis system including a gas chromatograph having a separation column, and a component detector, wherein the component detector includes an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, and a photodetector that detects light generated in the reaction cell, and a downstream end of the first flow path and the inlet of the reaction cell are connected to each other or connected via a second flow path having a length of not more than 100 cm.

A fourth aspect of the present invention relates to a component detector used along with a gas chromatograph having a separation column, the component detector including an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, and a photodetector that detects light generated in the reaction cell, wherein a downstream end of the first flow path and the inlet of the reaction cell are connected to each other or connected via a second flow path having a length of not more than 100 cm.

Advantageous Effect of the Invention

According to the present invention, a sample component can be detected with high accuracy.

DESCRIPTION OF EMBODIMENTS

Figure 1:
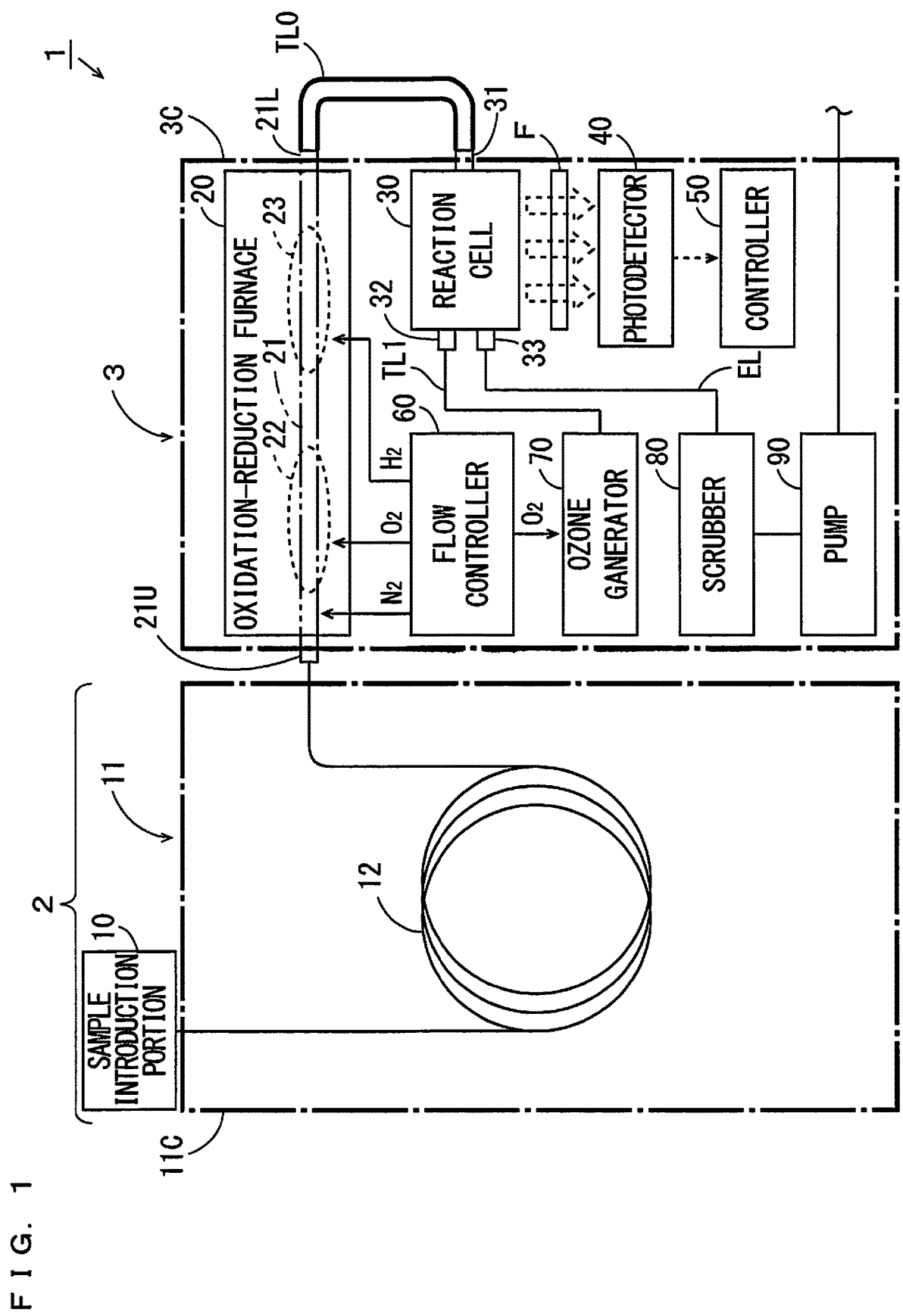
FIG. 1 is a diagram showing a configuration of a component analysis system according to an embodiment.

In an SCD, a sulfur component in a sample is oxidized and reduced, so that sulfur monoxide (SO) is produced. The sulfur monoxide produced here is chemically unstable. The inventors of the present invention focused on this point and carried out simulations on transformation of the sulfur monoxide until the sulfur monoxide reaches a reaction cell from an oxidation-reduction furnace. As the result, it was found that the produced sulfur monoxide was transformed into another sulfur compound such as hydrogen sulfide ($H_2S$) as a period of time in which the sulfur monoxide passed through a flow path (the above-described transfer tube) from the oxidation-reduction furnace to the reaction cell (hereinafter referred to as the transfer time) became longer.

The other sulfur compound obtained by the transformation is unlikely to be in an excited state as compared to sulfur monoxide even if the other sulfur compound is introduced into the reaction cell and reacts with ozone ($O_3$). As such, sulfur compounds other than the sulfur monoxide hardly contribute to generation of light in the reaction cell. As the result of these simulations and considerations, the inventors of the present invention obtained knowledge that more sulfur monoxides could be introduced into the reaction cell by shortening the transfer time of gas from the oxidation-reduction furnace to the reaction cell. Based on this knowledge, the inventors of the present invention found that the SCD having the configuration as described in Patent Document 1 could allow for improving detection accuracy for the sulfur component.

A component analysis system and a component detector according to an embodiment will be described below with reference to the drawing.

[1] Basic Configuration of Component Analysis System

FIG. 1 is a diagram showing a configuration of a component analysis system according to an embodiment. A component analysis system 1 according to this embodiment is configured to be capable of analyzing a sulfur component (a sulfur compound) in a sample and includes a gas chromatograph 2 and a component detector 3.

The gas chromatograph 2 includes a sample introduction portion 10 and a column oven 11. The column oven 11 has a configuration in which a separation column 12 and a heater not shown are provided in a column casing 11C. An upstream end of the separation column 12 is connected to the sample introduction portion 10. A downstream end of the separation column 12 is drawn to an outside of the column casing 11C. The sample introduction portion 10 is a so-called vaporizing chamber and injects a sample including a sulfur component and a solvent into a carrier gas supplied to the separation column 12.

The component detector 3 according to this embodiment is a Sulfur Chemiluminscence Detector (SCD). The component detector 3 includes an oxidation-reduction furnace 20, a reaction cell 30, a photodetector 40, a controller 50, a flow controller 60, an ozone generator 70, a scrubber 80, and a pump 90. Furthermore, the component detector 3 includes a detector casing 3C that stores these plurality of constituent elements.

The oxidation-reduction furnace 20 includes a flow path forming member 21 and a heater not shown. The flow path forming member 21 is constituted by a plurality of tubular members to extend linearly in one direction, and has an upstream end 21U and a downstream end 21L. A gas flow path formed by the flow path forming member 21 corresponds to a first flow path. The upstream end 21U of the flow path forming member 21 is connected to the downstream end of the separation column 12. In the oxidation-reduction furnace 20, a sample including a sulfur component is introduced into the upstream end 21U, so that sulfur monoxide (SO) is produced. A chemical reaction generated in the oxidation-reduction furnace 20 will be described in detail later. The oxidation-reduction furnace 20 is arranged in the detector casing 3C while being covered with a thermal insulator not shown.

The reaction cell 30 has a first inlet 31, a second inlet 32, and an outlet 33. The first inlet 31 is connected to the downstream end 21L of the flow path forming member 21 via a transfer tube TL0. A gas flow path formed by the transfer tube TL0 corresponds to a second flow path. The transfer tube TL0 is formed by a resin pipe having flexibility, for example.

In this embodiment, a length of the transfer tube TL0 is determined such that the sulfur monoxide produced in the oxidation-reduction furnace 20 is not transformed to exceed an allowable degree until the sulfur monoxide reaches the reaction cell 30 from the oxidation-reduction furnace 20, and is not more than 100 cm, for example. The length of the transfer tube TL0 is preferably not more than 70 cm and is more preferably not more than 55 cm. Also, the length of the transfer tube TL0 may be determined to be shorter than a length of the flow path forming member 21.

While the transfer tube TL0 is provided to be positioned outside of the detector casing 3C in the example of FIG. 1, at least part of the transfer tube TL0 may be provided to be positioned inside of the detector casing 3C. Moreover, in this embodiment, the downstream end 21L of the flow path forming member 21 and the first inlet 31 of the reaction cell 30 may be directly connected to each other. In this case, the transfer tube TL0 is not required.

The second inlet 32 is connected to the ozone generator 70 via a transfer tube TL1. The outlet 33 is connected with an exhaust tube EL. The scrubber 80 and the pump 90 are provided at the exhaust tube EL in this order from upstream to downstream. The pump 90 sucks the sample component separated in the separation column 12 of the gas chromatograph 2 together with the carrier gas through the exhaust tube EL, the reaction cell 30, the transfer tube TL0, and the flow path forming member 21. The scrubber 80 removes ozone from the gas flowing through the exhaust tube EL.

Nitrogen ($N_2$), oxygen ($O_2$), and hydrogen ($H_2$) are supplied to the flow controller 60 from a nitrogen supply source, an oxygen supply source, and a hydrogen supply source not shown. The flow controller 60 supplies the supplied nitrogen, oxygen, and hydrogen to different portions of the oxidation-reduction furnace 20. In the flow path forming member 21, the nitrogen-supplied portion, the oxygen-supplied portion, and the hydrogen-supplied portion are arranged in this order from the upstream to the downstream. The oxygen-supplied portion and the hydrogen-supplied portion in the flow path forming member 21 are referred to as an oxidation portion 22 and a reduction portion 23, respectively, in the following description.

The flow controller 60 further supplies the oxygen supplied from the oxygen supply source to the ozone generator 70. In this case, the ozone generator 70 produces ozone ($O_3$) from the supplied oxygen and supplies the produced ozone to the second inlet 32 of the reaction cell 30 through the transfer tube TL1.

The photodetector 40 is provided in proximity to the reaction cell 30. An optical filter F is provided between the reaction cell 30 and the photodetector 40. The optical filter F transmits light in a specific wavelength range and does not transmit light in the other wavelength ranges. In this embodiment, the specific wavelength range is determined to include a wavelength of light generated by a reaction of ozone with sulfur monoxide (light generated when sulfur dioxide transits to the ground state).

The photodetector 40 is a Photomultiplier Tube (PMT), for example, and detects light that is generated in the reaction cell 30 and passes through the optical filter F. Also, the photodetector 40 applies a detection signal corresponding to an amount of the detected light to the controller 50.

The controller 50 is constituted by a CPU (central processing unit) and a memory, for example, or a microcomputer and controls each constituent element of the component detector 3. The controller 50 further produces a chromatogram based on the detection signal applied from the photodetector 40. This makes it possible to calculate a concentration or the like of the sulfur component in the sample injected into the gas chromatograph 2 using the produced chromatogram.

In the above-mentioned component detector 3, the pump 90 is operated, so that the carrier gas including the sulfur component separated by the separation column 12 (hereinafter referred to as the target gas) is introduced into the flow path forming member 21 of the oxidation-reduction furnace 20. The target gas introduced into the flow path forming member 21 flows into the oxidation portion 22 while being mixed with the nitrogen supplied from the flow controller 60 in the vicinity of the upstream end 21U. The nitrogen is used to promote an oxidation-reduction reaction, described below, for the target gas and reduce contamination of the gas flow path in the component detector 3. It should be noted that the nitrogen does not need to be supplied to the oxidation-reduction furnace 20. Alternatively, another inert gas such as argon (Ar) in place of nitrogen may be supplied to the oxidation-reduction furnace 20.

In the oxidation portion 22, the sulfur component of the target gas is oxidized at a high temperature (e.g., approximately 1000° C.) by the oxygen supplied from the flow controller 60. Thus, sulfur dioxide ($SO_2$) is produced. The target gas including the sulfur dioxide flows into the reduction portion 23. In the reduction portion 23, the sulfur dioxide is reduced at a high temperature (e.g., approximately 850° C.) by the hydrogen supplied from the flow controller 60. Thus, unstable sulfur monoxide (SO) is produced. The target gas including the sulfur monoxide flows into the first inlet 31 of the reaction cell 30 through the transfer tube TL0 from the downstream end 21L of the flow path forming member 21.

In the reaction cell 30, the target gas introduced from the first inlet 31 and the ozone introduced from the second inlet 32 by the ozone generator 70 are mixed. Thus, an excited species of sulfur dioxide ($SO_2$) is produced by a reaction of the sulfur monoxide with the ozone. The produced sulfur dioxide transits to the ground state. Light generated at that time is detected by the photodetector 40 through the optical filter F. A chromatogram of the sample introduced into the gas chromatograph 2 is produced based on a detection signal output from the photodetector 40.

An atmosphere in the reaction cell 30 includes ozone. As such, the atmosphere in the reaction cell 30 is discharged to outside of the component detector 3 through the exhaust tube while being detoxified by removal of the ozone by the scrubber 80.

[2] Length of Gas Flow Path from Oxidation-reduction Furnace 20 to Reaction Cell 30

As described above, in the component detector 3 according to this embodiment, the upstream end 21U of the oxidation-reduction furnace 20 and the first inlet 31 of the reaction cell 30 are connected via the transfer tube TL0 having a length not more than 100 cm or directly connected.

With this configuration, during the detection of the sulfur component in the sample by the component detector 3, the sulfur monoxide generated in the oxidation-reduction furnace 20 is introduced into the reaction cell 30 in a comparatively short time. Thus, the sulfur monoxide generated in the oxidation-reduction furnace 20 reaches the reaction cell 30 without being transformed to exceed an allowable degree. As a result, the sulfur component in the sample can be detected with high accuracy. The present inventors carried out tests and evaluations shown below in order to confirm this effect.

The present inventors prepared an SCD in which an oxidation-reduction furnace and a reaction cell are connected by a transfer tube having a length of 55 cm as an SCD according to an inventive example. On the other hand, the present inventors prepared an SCD in which an oxidation-reduction furnace and a reaction cell are connected by a transfer tube having a length of 150 cm as an SCD according to a comparative example.

Then, the present inventors repetitively carried out detection of a sulfur component as to a same sample ten times using each of the SCD according to the inventive example and the SCD according to the comparative example. The present inventors carried out evaluation as shown below based on each result of the detection.

Figure 2:
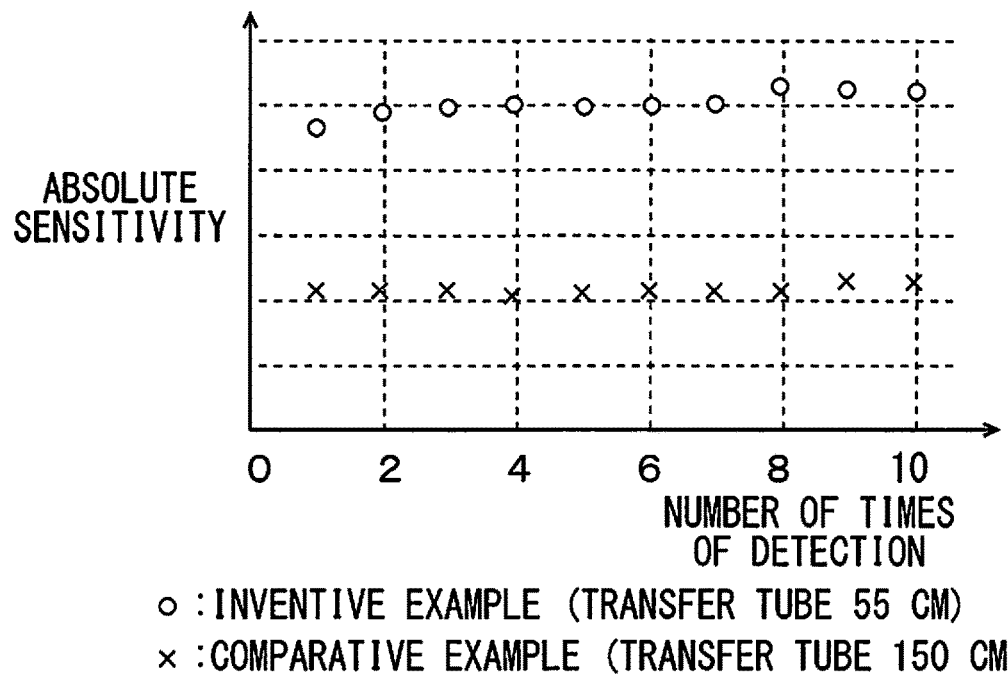
FIG. 2 is a diagram showing results of comparison between absolute sensitivities of SCDs according to an inventive example and a comparative example.

First, the present inventors compared absolute sensitivities of the inventive example and the comparative example based on the results of the detection by the SCD according to the inventive example and the SCD according to the comparative example. FIG. 2 is a diagram showing the results of the detection of the absolute sensitivities by the SCDs according to the inventive example and the comparative example. In the graph of FIG. 2, an ordinate indicates absolute sensitivity and an abscissa indicates a number of times of detection. Also, circle marks correspond to the inventive example and x marks correspond to the comparative example in FIG. 2. The absolute sensitivity was obtained by extracting a peak corresponding to the sulfur component in the sample from a chromatogram produced by each SCD each time the sulfur component was detected by each SCD, and calculating an area value of the extracted peak. According to the graph of FIG. 2, the absolute sensitivity of the SCD of the inventive example was higher than that of the SCD of the comparative example at all number of times from the first time to the tenth time.

Figure 3:
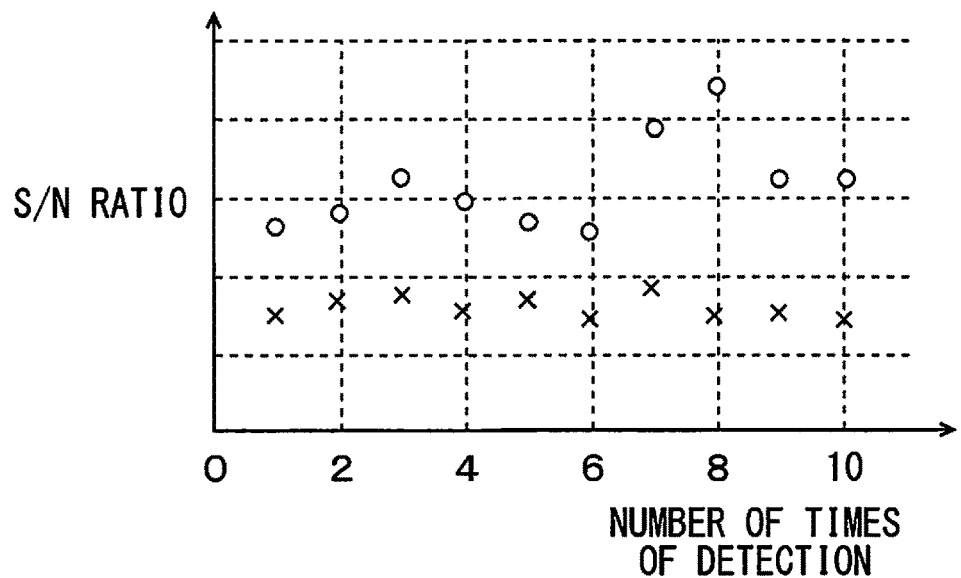
FIG. 3 is a diagram showing results of comparison between S/N ratios of the SCDs according to the inventive example and the comparative example.

Also, the present inventors compared S/N (signal/noise) ratios with respect to detection signals output by photodetectors of the SCDs according to the inventive example and the comparative example, based on the results of the detection by those SCDs. FIG. 3 is a diagram showing results of the comparison between the S/N ratios by the SCDs according to the inventive example and the comparative example. In the graph of FIG. 3, an ordinate represents the S/N ratio and an abscissa represents the number of times of detection. Also, circle marks correspond to the inventive example and x marks correspond to the comparative example in FIG. 3. The S/N ratio was calculated by applying a noise calculation method defined in ASTM (American Society for Testing and Materials) to the produced chromatogram each time the sulfur component was detected by each SCD. According to the graph of FIG. 3, the S/N ratio of the detection signal obtained by the SCD of the inventive example was higher than that of the detection signal obtained by the SCD of the comparative example at all number of times from the first time to the tenth time.

Figure 4:
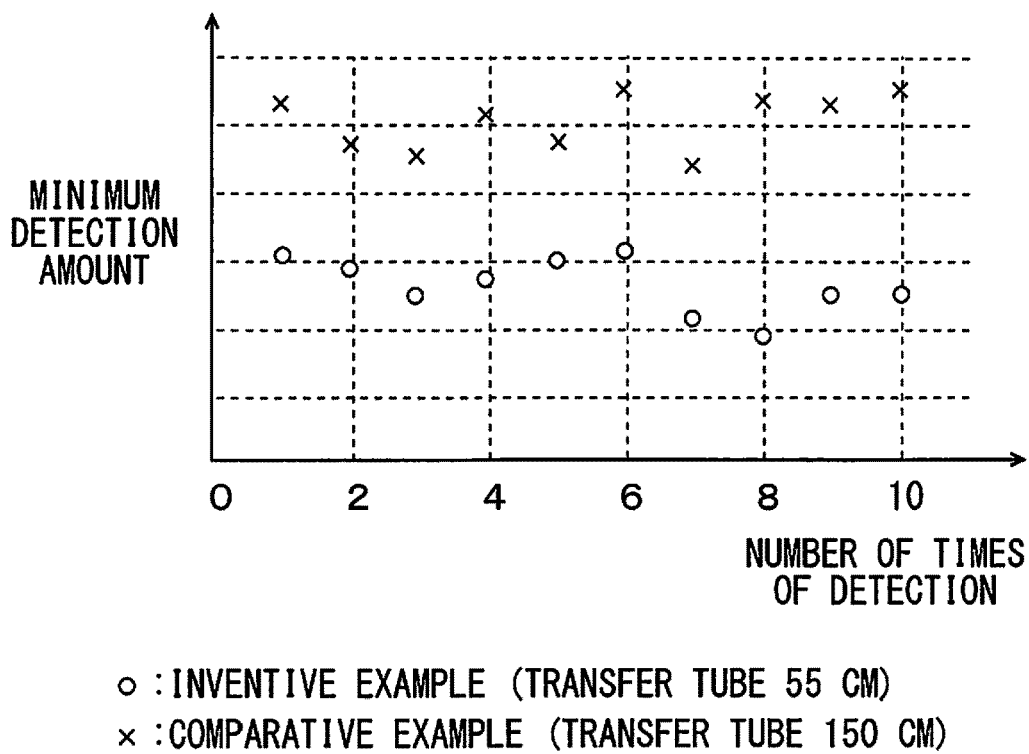
FIG. 4 is a diagram showing results of comparison between minimum detection amounts by the SCDs according to the inventive example and the comparative example.

Also, the present inventors compared minimum amounts of the sulfur component that were considered to be detectable per unit time (hereinafter referred to as the minimum detection amounts) in the SCDs of the inventive example and the comparative example, based on the result of detection by each of the SCDs according to the inventive example and the comparative example. FIG. 4 is a diagram showing results of the comparison between the minimum detection amounts by the SCDs according to the inventive example and the comparative example. An ordinate represents the minimum detection amount and an abscissa represents the number of times of detection in FIG. 4. Also, circle marks correspond to the inventive example and x marks correspond to the comparative example in FIG. 4. The minimum detection amount was calculated based on the produced chromatogram each time the sulfur component was detected by each SCD. According to the graph of FIG. 4, the minimum detection amount by the SCD of the inventive example was lower than that by the SCD of the comparative example at all number of times from the first time to the tenth time.

Figure 5:
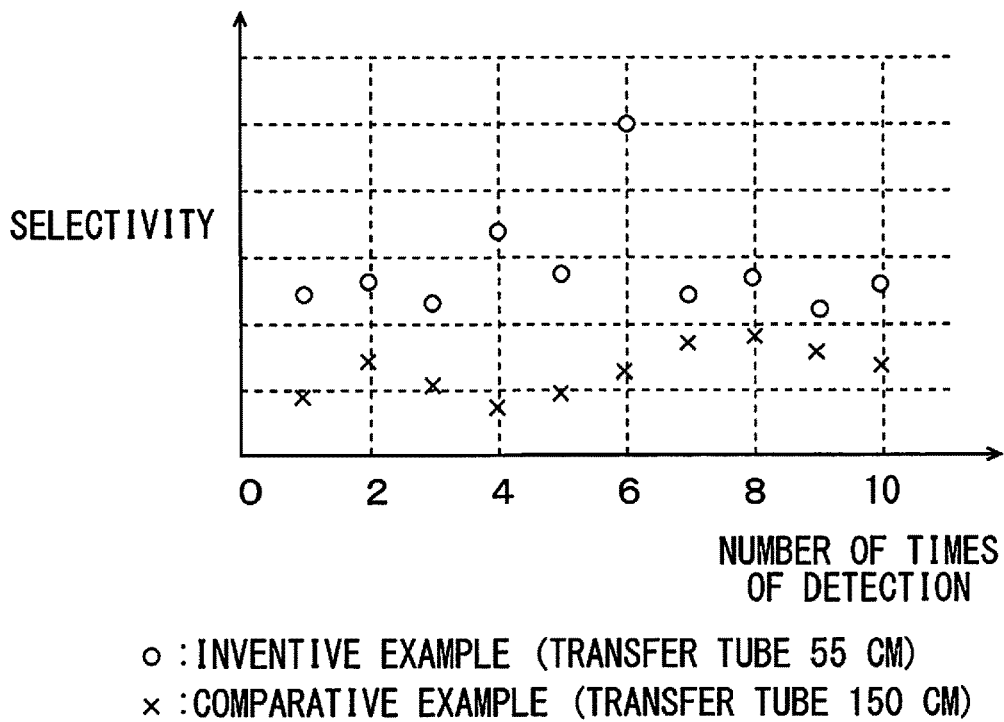
FIG. 5 is a diagram showing results of comparison between selectivities of a sulfur component by the SCDs according to the inventive example and the comparative example.

Moreover, the present inventors compared selectivities of the sulfur component in the SCDs according to the inventive example and the comparative example, based on the result of detection by each of the SCDs according to the inventive example and the comparative example. FIG. 5 is a diagram showing results of the comparison between the selectivities of the sulfur component in the SCDs according to the inventive example and the comparative example. An ordinate represents the selectivity and an abscissa represents the number of times of detection in the graph of FIG. 5. Also, circle marks correspond to the inventive example and x marks correspond to the comparative example in FIG. 5. The selectivity was calculated by extracting peaks respectively corresponding to the sulfur component and a solvent component of the sample from the produced chromatogram each time the sulfur component was detected by each SCD, and dividing an area value of the peak of the sulfur component by an area value of the peak of the solvent component. According to the graph of FIG. 5, the selectivity of the sulfur component in the SCD of the inventive example was higher than that in the SCD of the comparative example at all number of times from the first time to the tenth time.

Based on the above-described tests and evaluation results, it was confirmed that the characteristics relating to the detection sensitivity, the S/N ratio, the minimum detection amount, and the selectivity of the sulfur component were improved in the case where the 55 cm transfer tube was used as compared to the case where the 150 cm transfer tube was used.

[3] Plurality of Arrangement Examples of Oxidation-Reduction Furnace 20 and Reaction Cell 30

In this embodiment, the oxidation-reduction furnace 20 and the reaction cell 30 are stored in the one detector casing 3C in order to shorten the length of the gas flow path between the upstream end 21U of the oxidation-reduction furnace 20 and the first inlet 31 of the reaction cell 30.

Here, the detector casing 3C of this example has a substantially cuboid shape and has six outer surfaces directed in different directions. One of the six outer surfaces of the detector casing 3C is arranged to face the user when the component analysis system 1 is used. This outer surface is referred to as a front surface of the detector casing 3C, and the outer surface that is parallel to the front surface and faces the front surface is referred to as a back surface. With the front surface viewed from a center of the detector casing 3C, the outer surface positioned rightward of the center is referred to as a right side surface, and the outer surface positioned leftward of the center is referred to as a left side surface. Moreover, the outer surface directed upward is referred to as an upper surface, and the outer surface directed downward is referred to as a lower surface.

Also, in the description below, a direction directed to the front surface, a direction directed to the back surface, a direction directed to the right side surface, a direction directed to the left side surface, a direction directed to the upper surface, and a direction directed to the lower surface with respect to the center of the detector casing 3C are referred to as forward, backward, rightward, leftward, upward, and downward of the component detector 3, respectively.

A plurality of arrangement examples of the oxidation-reduction furnace 20 and the reaction cell 30 within the detector casing 3C will be described below.

(a) First Arrangement Example

Figure 6:
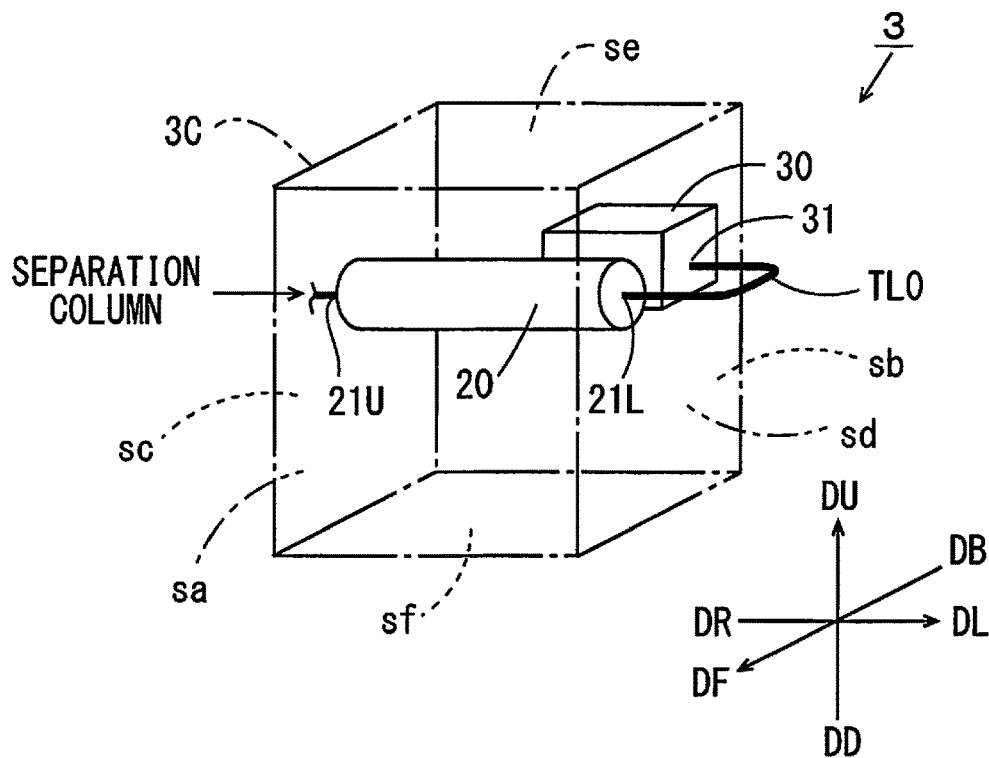
FIG. 6 is a schematic perspective view for explaining a first arrangement example of an oxidation-reduction furnace and a reaction cell.

FIG. 6 is a schematic perspective view for explaining a first arrangement example of the oxidation-reduction furnace 20 and the reaction cell 30. In FIG. 6 and FIGS. 7 to 14 described later, the detector casing 3C is denoted by a dot and dashed line, and the oxidation-reduction furnace 20 and the reaction cell 30 are denoted by a solid line. Three arrows are shown to denote forward DF, backward DB, rightward DR, leftward DL, upward DU, and downward DD in the component detector 3.

In the first arrangement example, the oxidation-reduction furnace 20 and the reaction cell 30 are arranged in a front-and-rear direction in the detector casing 3C. Specifically, the oxidation-reduction furnace 20 is positioned forward DF of the reaction cell 30. Also, the oxidation-reduction furnace 20 extends in a right-and-left direction such that the upstream end 21U is directed rightward DR and the downstream end 21L is directed leftward DL. In this way, a longitudinal direction of the oxidation-reduction furnace 20 intersects with the direction in which the oxidation-reduction furnace 20 and the reaction cell 30 line up in the first arrangement example. The first inlet 31 of the reaction cell 30 is directed leftward DL. With this arrangement, since the direction in which the downstream end 21L is directed coincides with the direction in which the first inlet 31 is directed, it is possible to further shorten the length of the transfer tube TL0.

Also, since the upstream end 21U of the oxidation-reduction furnace 20 is directed rightward DR, it is possible to shorten the length of the gas flow path between the gas chromatograph 2 and the component detector 3 by arranging the gas chromatograph 2 at a position rightward DR of the component detector 3.

In addition, in the first arrangement example, the downstream end 21L of the oxidation-reduction furnace 20 and the first inlet 31 of the reaction cell 30 are arranged within a common plane (a left side surface sd in this example) that is orthogonal to the longitudinal direction of the oxidation-reduction furnace 20. Thus, it is possible to further shorten the length of the transfer tube TL0.

In the first arrangement example, the oxidation-reduction furnace 20 is positioned at a same height as the reaction cell 30. In this case, even if the atmosphere heated by heat generated in the oxidation-reduction furnace 20 rises up, the photodetector 40 (FIG. 1) provided in proximity to the reaction cell 30 is unlikely to be affected by the heat generated in the oxidation-reduction furnace 20. Thus, a decrease in detection accuracy of the photodetector 40 due to the heat is inhibited and also a decrease in life of the photodetector 40 is inhibited.

The transfer tube TL0 is preferably provided to be attachable to and detachable from the downstream end 21L of the oxidation-reduction furnace 20 and the first inlet 31 of the reaction cell 30 in the outside of the detector casing 3C. In this case, it is possible to carry out maintenance of the oxidation-reduction furnace 20 and the reaction cell 30 from the outside of the detector casing 3C. Specifically, it is possible to carry out cleaning of the inside of the flow path forming member 21, replacement of the flow path forming member 21, cleaning of the inside of the reaction cell 30, or the like. Thus, maintainability of the component detector 3 is improved.

Here, in the oxidation-reduction furnace 20, a temperature suitable for oxidation (approximately 1000° C.) is higher than a temperature suitable for reduction (approximately 850° C.). In this respect, in the first arrangement example, the flow path forming member 21 of the oxidation-reduction furnace 20 extends in the right-and-left direction and, therefore, the oxidation portion 22 and the reduction portion 23 of the oxidation-reduction furnace 20 are arranged in the right-and-left direction. In this case, since the reduction portion 23 is not positioned upward DU of the oxidation portion 22, a temperature environment of the reduction portion 23 is unlikely to be affected by the atmosphere heated around the oxidation portion 22. That is, the temperature of the reduction portion 23 is not excessively raised due to the temperature of the oxidation portion 22. Thus, an oxidation-reduction reaction in the flow path forming member 21 is appropriately carried out.

Alternatively, in the first arrangement example, positions of the oxidation-reduction furnace 20 and the reaction cell 30 in the detector casing 3C may be inverted with respect to an vertical plane orthogonal to the right-and-left direction (inversion in the right-and-left direction). In this case, the upstream end 21U of the oxidation-reduction furnace 20 is directed leftward DL. Thus, it is possible to shorten the length of the gas flow path between the gas chromatograph 2 and the component detector 3 by arranging the gas chromatograph 2 at a position leftward DL of the component detector 3.

Also, in the first arrangement example, the positions of the oxidation-reduction furnace 20 and the reaction cell 30 in the detector casing 3C may be inverted with respect to a vertical plane orthogonal to the front-and-rear direction (inversion in the front-and-rear direction). That is, the positions of the oxidation-reduction furnace 20 and the reaction cell 30 may be replaced with each other.

(b) Second Arrangement Example

Figure 7:
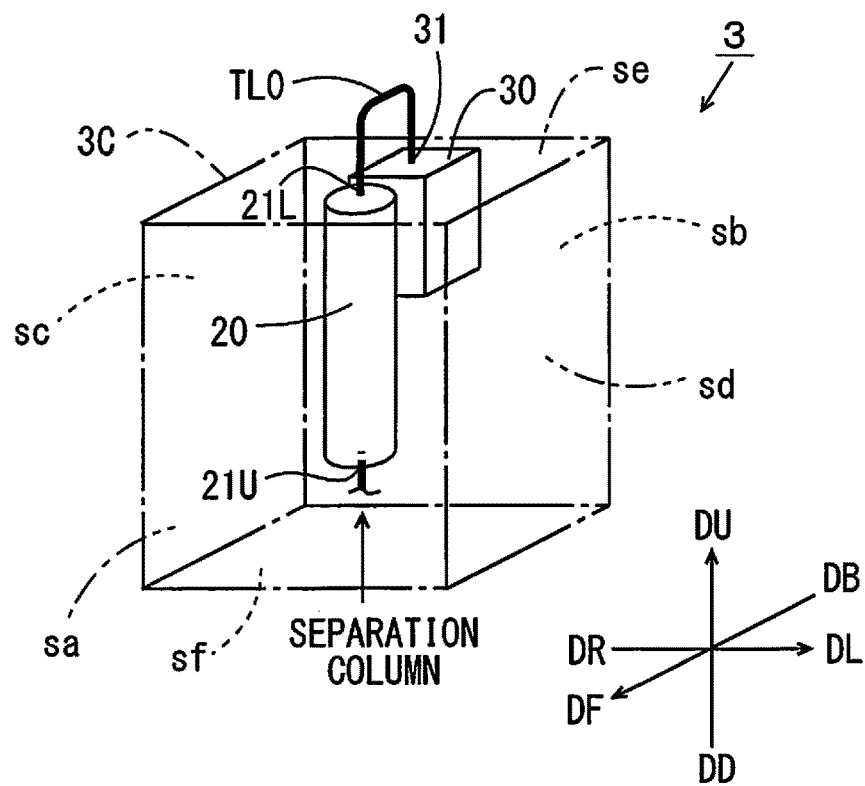
FIG. 7 is a schematic perspective view for explaining a second arrangement example of the oxidation-reduction furnace and the reaction cell.

FIG. 7 is a schematic perspective view for explaining a second arrangement example of the oxidation-reduction furnace 20 and the reaction cell 30. The second arrangement example differs from the first arrangement example in that the oxidation-reduction furnace 20 is provided to extend in a top-and-bottom direction. Specifically, the oxidation-reduction furnace 20 extends in the top-and-bottom direction at a position forward DF of the reaction cell 30 such that the upstream end 21U is directed downward DD and the downstream end 21L is directed upward DU. Also in this example, the longitudinal direction of the oxidation-reduction furnace 20 intersects with the direction in which the oxidation-reduction furnace 20 and the reaction cell 30 line up. The first inlet 31 of the reaction cell 30 is directed upward DU. With this arrangement, since the direction in which the downstream end 21L is directed coincides with the direction in which the first inlet 31 is directed, it is possible to further shorten the length of the transfer tube TL0.

Also, since the upstream end 21U of the oxidation-reduction furnace 20 is directed downward DD, it is possible to shorten the length of the gas flow path between the gas chromatograph 2 and the component detector 3 by arranging the gas chromatograph 2 at a position downward DD of the component detector 3.

Also in this example, similarly to the first arrangement example, the downstream end 21L of the oxidation-reduction furnace 20 and the first inlet 31 of the reaction cell 30 are provided within a common plane (an upper surface se in this example) that is orthogonal to the longitudinal direction of the oxidation-reduction furnace 20. Thus, it is possible to further shorten the length of the transfer tube TL0.

Also, similarly to the first arrangement example, the transfer tube TL0 is preferably provided to be attachable to and detachable from the downstream end 21L of the oxidation-reduction furnace 20 and the first inlet 31 of the reaction cell 30 in the outside of the detector casing 3C. Thus, the maintainability of the component detector 3 is improved.

Alternatively, in the second arrangement example, the positions of the oxidation-reduction furnace 20 and the reaction cell 30 in the detector casing 3C may be inverted with respect to the vertical plane orthogonal to the frontand-rear direction (inversion in the front-and-rear direction). That is, the positions of the oxidation-reduction furnace 20 and the reaction cell 30 may be replaced with each other.

Also, in second arrangement example, the positions of the oxidation-reduction furnace 20 and the reaction cell 30 in the detector casing 3C may be inverted with respect to a horizontal plane (inversion in the top-and-bottom direction). In this case, the oxidation portion 22 is positioned farther upward than the reduction portion 23 in the oxidation-reduction furnace 20. Thus, the temperature environment of the reduction portion 23 is unlikely to be affected by the atmosphere heated around the oxidation portion 22. Accordingly, the oxidation-reduction reaction in the flow path forming member 21 is appropriately carried out.

(c) Third Arrangement Example

Figure 8:
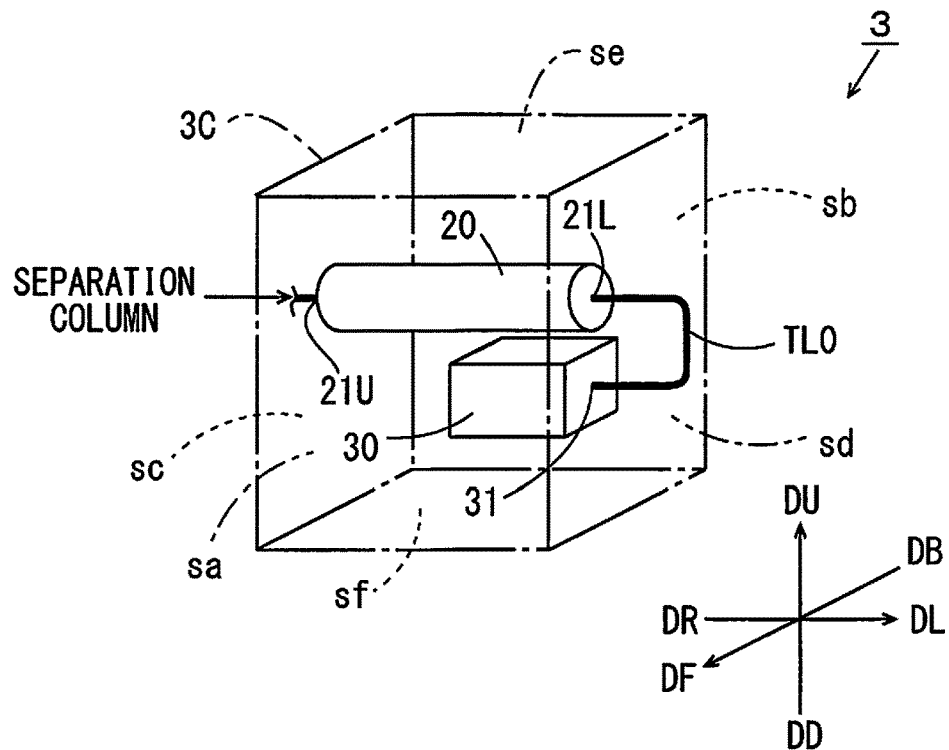
FIG. 8 is a schematic perspective view for explaining a third arrangement example of the oxidation-reduction furnace and the reaction cell.

FIG. 8 is a schematic perspective view for explaining a third arrangement example of the oxidation-reduction furnace 20 and the reaction cell 30. As shown in FIG. 8, the third arrangement example differs from the first arrangement example in that the oxidation-reduction furnace 20 and the reaction cell 30 are arranged in the top-and-bottom direction in the detector casing 3C. Also in this example, the longitudinal direction of the oxidation-reduction furnace 20 intersects with the direction in which the oxidation-reduction furnace 20 and the reaction cell 30 line up. Specifically, in the example of FIG. 8, the oxidation-reduction furnace 20 is positioned upward of the reaction cell 30. In this case, it is possible to further reduce the influence exerted on the photodetector 40 (FIG. 1) by the heat generated in the oxidation-reduction furnace 20. Except for this point, with the third arrangement example shown in FIG. 8, an effect similar to that of the first arrangement example can be obtained.

Alternatively, in the third arrangement example, the positions of the oxidation-reduction furnace 20 and the reaction cell 30 in the detector casing 3C may be inverted with respect to the vertical plane orthogonal to the right-and-left direction (inversion in the right-and-left direction).

Also, in the third arrangement example, the positions of the oxidation-reduction furnace 20 and the reaction cell 30 in the detector casing 3C may be inverted with respect to the horizontal plane (inversion in the top-and-bottom direction). That is, the positions of the oxidation-reduction furnace 20 and the reaction cell 30 may be replaced with each other.

(d) Fourth Arrangement Example

Figure 9:
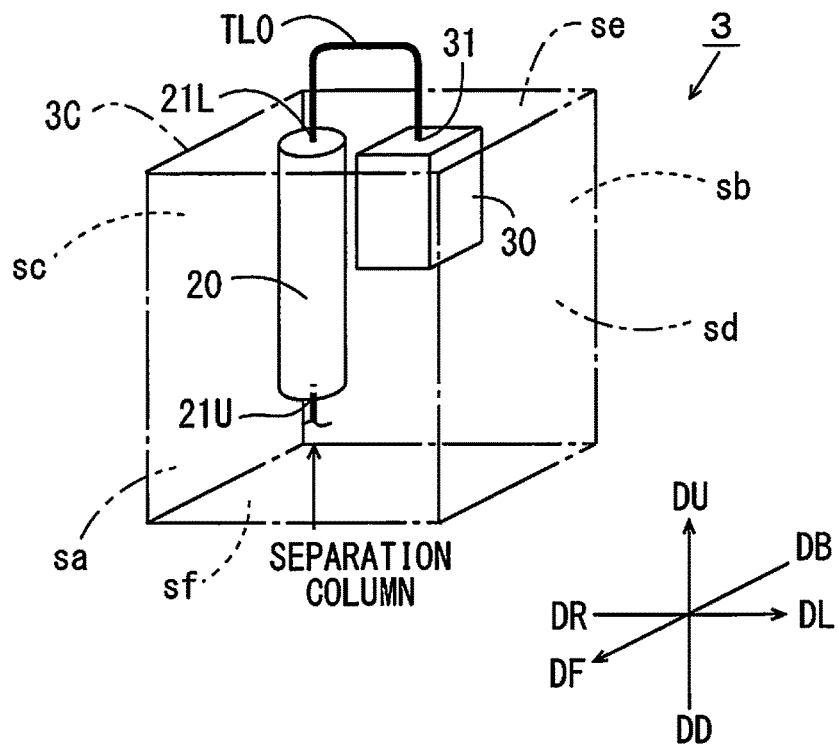
FIG. 9 is a schematic perspective view for explaining a fourth arrangement example of the oxidation-reduction furnace and the reaction cell.

FIG. 9 is a schematic perspective view for explaining a fourth arrangement example of the oxidation-reduction furnace 20 and the reaction cell 30. The fourth arrangement example differs from the second arrangement example in that the oxidation-reduction furnace 20 and the reaction cell 30 are arranged in the right-and-left direction in the detector casing 3C. Also in this example, the longitudinal direction of the oxidation-reduction furnace 20 intersects with the direction in which the oxidation-reduction furnace 20 and the reaction cell 30 line up. Specifically, the oxidation-reduction furnace 20 is positioned rightward DR of the reaction cell 30. Also in this example, an effect similar to that of the second arrangement example can be obtained.

Alternatively, in the fourth arrangement example, the positions of the oxidation-reduction furnace 20 and the reaction cell 30 in the detector casing 3C may be inverted with respect to the vertical plane orthogonal to the right-and-left direction (inversion in the right-and-left direction). That is, the positions of the oxidation-reduction furnace 20 and the reaction cell 30 may be replaced with each other.

Also, in the fourth arrangement example, the positions of the oxidation-reduction furnace 20 and the reaction cell 30 in the detector casing 3C may be inverted with respect to the horizontal plane (inversion in the top-and-bottom direction).

(e) Fifth Arrangement Example

Figure 10:
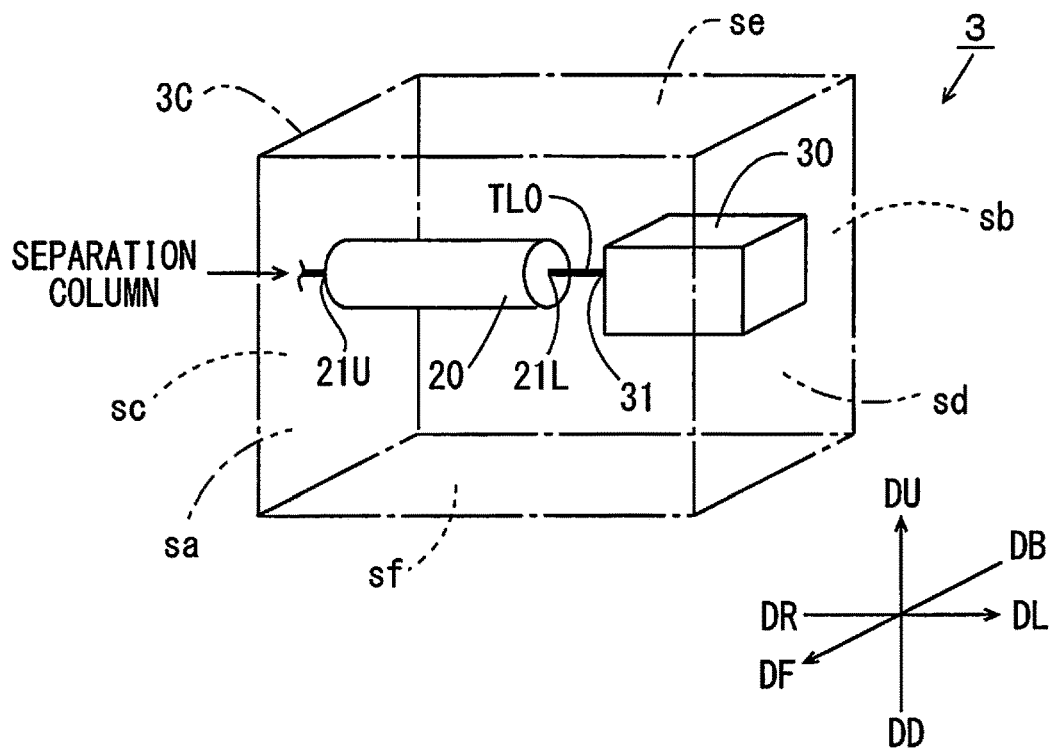
FIG. 10 is a schematic perspective view for explaining a fifth arrangement example of the oxidation-reduction furnace and the reaction cell.

FIG. 10 is a schematic perspective view for explaining a fifth arrangement example of the oxidation-reduction furnace 20 and the reaction cell 30. The fifth arrangement example differs from the fourth arrangement example in that the oxidation-reduction furnace 20 is provided to extend in the right-and-left direction. In this example, the direction in which the oxidation-reduction furnace 20 and the reaction cell 30 line up and the longitudinal direction of the oxidation-reduction furnace 20 are parallel to and coincident with each other. Furthermore, in this example, the reaction cell 30 is arranged such that the first inlet 31 faces the downstream end 21L of the oxidation-reduction furnace 20. With this configuration, it is possible to further shorten the length of the transfer tube TL0. Alternatively, the positions of the oxidation-reduction furnace 20 and the reaction cell 30 may be replaced with each other.

(f) Sixth Arrangement Example

Figure 11:
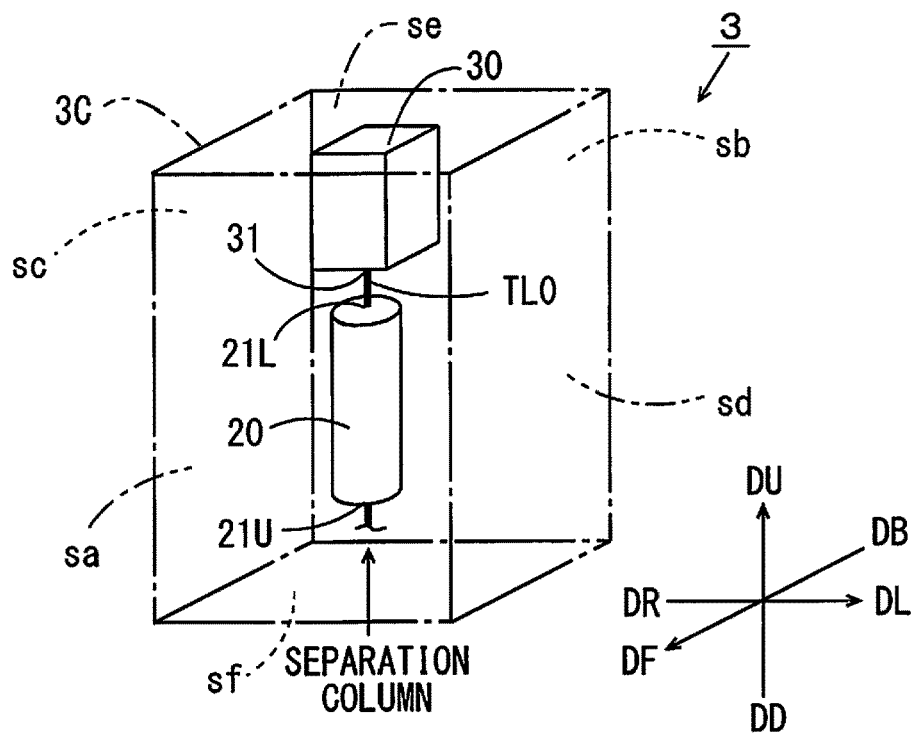
FIG. 11 is a schematic perspective view for explaining a sixth arrangement example of the oxidation-reduction furnace and the reaction cell.

FIG. 11 is a schematic perspective view for explaining a sixth arrangement example of the oxidation-reduction furnace 20 and the reaction cell 30. The sixth arrangement example differs from the third arrangement example in that the oxidation-reduction furnace 20 is provided to extend in the top-and-bottom direction. In this example, the direction in which the oxidation-reduction furnace 20 and the reaction cell 30 line up and the longitudinal direction of the oxidation-reduction furnace 20 are parallel to and coincident with each other. Furthermore, in this example, the reaction cell 30 is arranged so as to line up with the oxidation-reduction furnace 20 in the top-and-bottom direction and such that the first inlet 31 faces the downstream end 21L of the oxidation-reduction furnace 20. With this configuration, it is possible to further shorten the length of the transfer tube TL0. Alternatively, the positions of the oxidation-reduction furnace 20 and the reaction cell 30 may be replaced with each other.

(g) Seventh Arrangement Example

Figure 12:
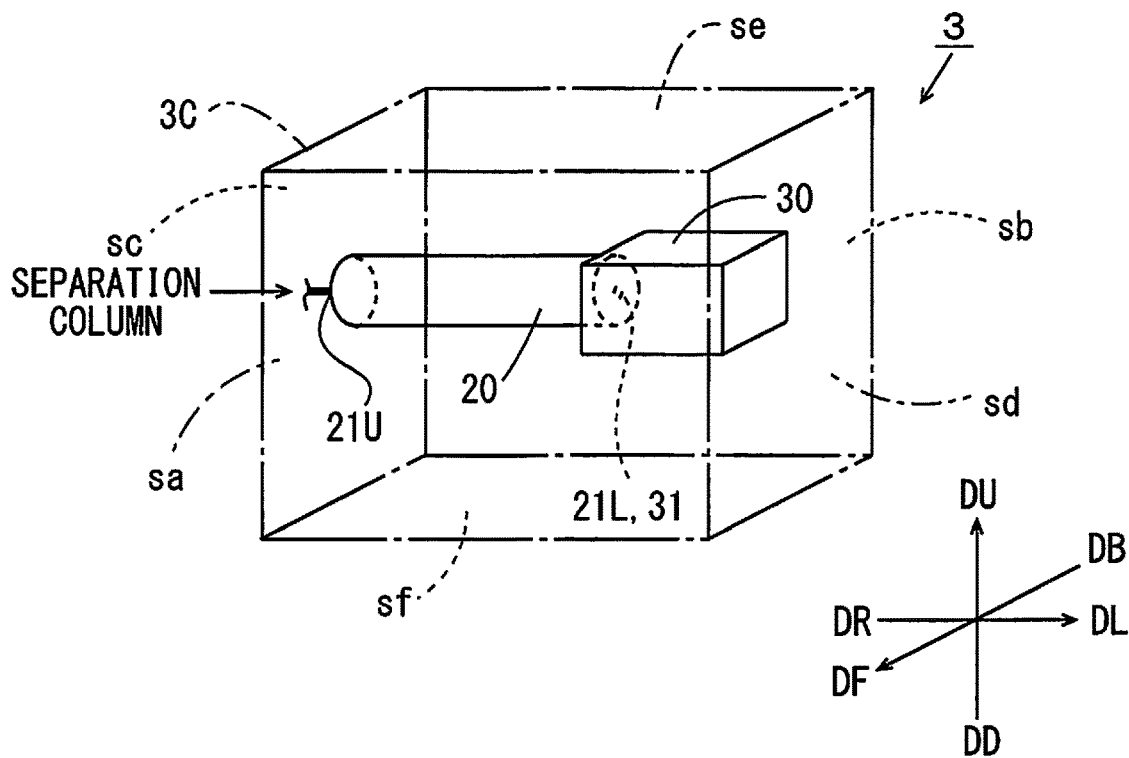
FIG. 12 is a schematic perspective view for explaining a seventh arrangement example of the oxidation-reduction furnace and the reaction cell.

FIG. 12 is a schematic perspective view for explaining a seventh arrangement example of the oxidation-reduction furnace 20 and the reaction cell 30. The seventh arrangement example differs from the fifth arrangement example in that the downstream end 21L of the oxidation-reduction furnace 20 and the first inlet 31 of the reaction cell 30 are directly connected to each other. With this configuration, the sulfur monoxide produced in the oxidation-reduction furnace 20 is introduced into the reaction cell 30 without being transformed. Alternatively, the positions of the oxidation-reduction furnace 20 and the reaction cell 30 may be replaced with each other.

(h) Eighth Arrangement Example

Figure 13:
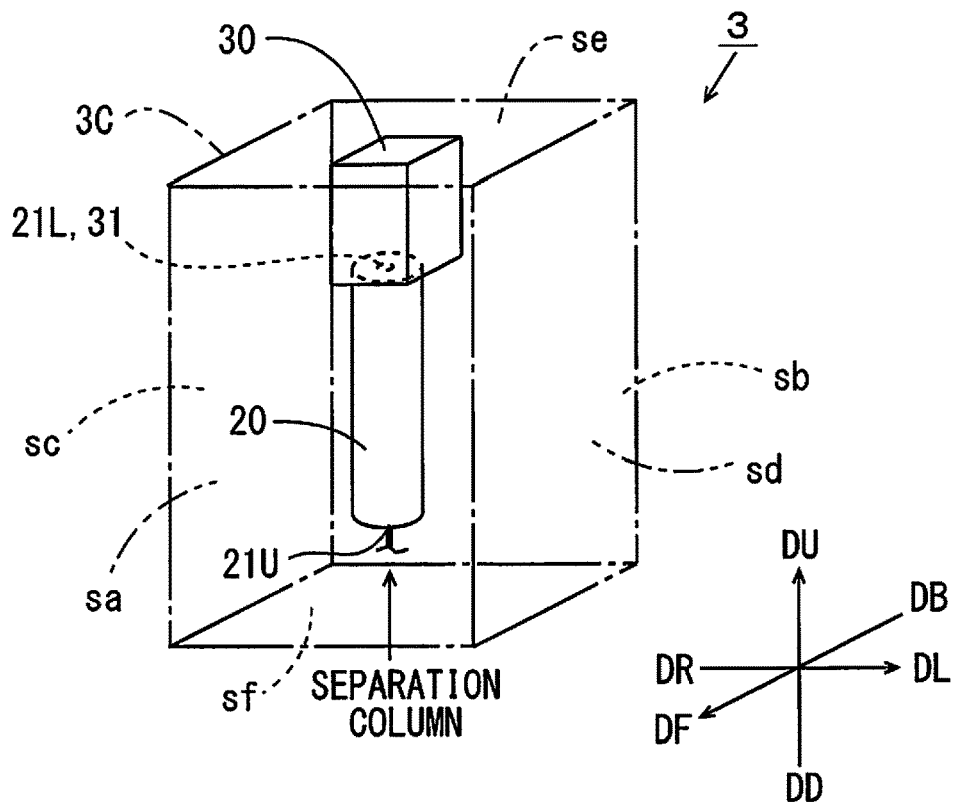
FIG. 13 is a schematic perspective view for explaining an eighth arrangement example of the oxidation-reduction furnace and the reaction cell.

FIG. 13 is a schematic perspective view for explaining an eighth arrangement example of the oxidation-reduction furnace 20 and the reaction cell 30. The eighth arrangement example differs from the sixth arrangement example in that the downstream end 21L of the oxidation-reduction furnace 20 and the first inlet 31 of the reaction cell 30 are directly connected to each other. With this configuration, the sulfur monoxide produced in the oxidation-reduction furnace 20 is introduced into the reaction cell 30 without being transformed. Alternatively, the positions of the oxidation-reduction furnace 20 and the reaction cell 30 may be replaced with each other.

(i) Others

Figure 14:
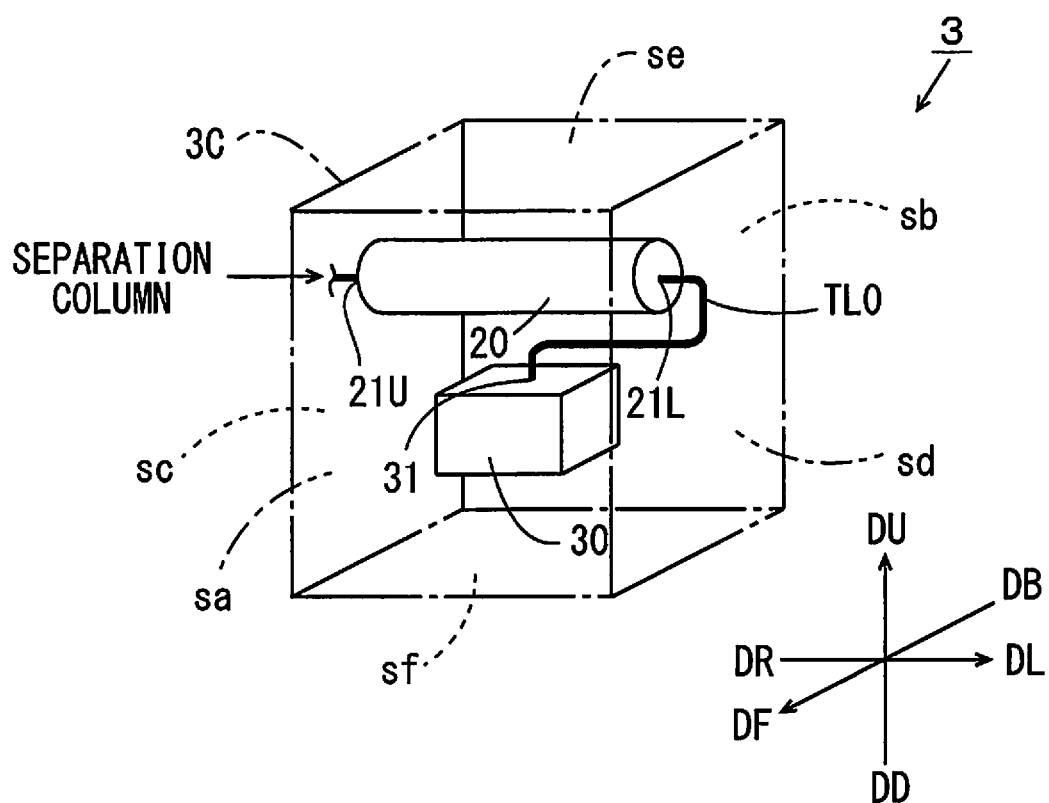
FIG. 14 is a schematic perspective view showing a state where a first inlet is provided to face the oxidation-reduction furnace in the second arrangement example.

In the above-described first to fourth arrangement examples, the first inlet 31 of the reaction cell 30 may be provided to be directed in a direction different from the direction in which the downstream end 21L of the oxidation-reduction furnace 20 is directed. In this case, the first inlet 31 is preferably provided to be directed to the oxidation-reduction furnace 20. FIG. 14 is a schematic perspective view showing a state where the first inlet 31 is provided to be directed to the oxidation-reduction furnace 20 in the third arrangement example.

In the example of FIG. 14, the reaction cell 30 is arranged downward of the oxidation-reduction furnace 20. The first inlet 31 is provided in the reaction cell 30 so as to be directed to the oxidation-reduction furnace 20. This makes it possible to shorten the length of the transfer tube TL0 as compared to a case where the first inlet 31 is provided so as not to be directed to the oxidation-reduction furnace 20.

Alternatively, also in this example, the positions of the oxidation-reduction furnace 20 and the reaction cell 30 may be replaced with each other. Also in this example, the transfer tube TL0 is preferably provided to be attachable to and detachable from the downstream end 21L of the oxidation-reduction furnace 20 in the outside of the detector casing 3C. This enables maintenance of the oxidation-reduction furnace 20.

While the oxidation-reduction furnace 20 is provided to extend in the top-and-bottom direction and in the right-and-left direction in the detector casing 3C in the above-described first to eighth arrangement examples, the oxidation-reduction furnace 20 may be provided to extend in the front-and-rear direction in the detector casing 3C. In this case, it is possible to reduce sizes of the detector casing 3C in the right-and-left direction and in the top-and-bottom direction.

[4] Effects (a) In the component detector 3 according to this embodiment, since the oxidation-reduction furnace 20 and the reaction cell 30 are stored in the one detector casing 3C, a distance between the oxidation-reduction furnace 20 and the reaction cell 30 can be shortened. Thus, the downstream end 21L of the oxidation-reduction furnace 20 and the first inlet 31 of the reaction cell 30 can be connected to each other or connected via the transfer tube TL0 having a comparatively short length. In this case, a transfer time of sulfur monoxide can be shortened such that a large part of sulfur monoxide reduced in the oxidation-reduction furnace 20 is not transformed until the large part of the sulfur monoxide reaches the reaction cell 30. Accordingly, a chemical reaction required for detection of a sulfur component can be stably generated in the reaction cell 30. As a result, the sulfur component separated by the separation column 12 can be detected with high accuracy.

(b) In the oxidation-reduction furnace 20, when a large amount of solvent (organic matter) is introduced from the separation column 12, compounds such as an OH radical and a CH radical are sometimes produced due to the solvent. The OH radical and the CH radical generate light by reacting with ozone in the reaction cell 30. Wavelengths of the light are close to a wavelength of light generated by reaction of the sulfur monoxide with ozone. As such, the light generated by the reaction of the OH radical and the CH radical is detected by the photodetector 40 through the optical filter F. Thus, if the amount of the OH radical and the CH radical is larger than that of the sulfur monoxide that reaches the reaction cell 30, the S/N ratio of the SCD is reduced.

Also, the present inventors carried out simulation as to degrees of transformation of the sulfur monoxide and the OH radical per unit time produced by the oxidation-reduction furnace 20. As a result, it was confirmed that the degree of transformation of the sulfur monoxide was larger than that of the OH radical. That is, it was confirmed that the sulfur monoxide was likely to be transformed while being transferred to the reaction cell as compared to the OH radical produced due to the solvent in the oxidation-reduction furnace. This means that the selectivity of the sulfur component is deteriorated as the transfer time from the oxidation-reduction furnace 20 to the reaction cell 30 becomes longer.

In these respects, with the component detector 3 according to this embodiment, the transfer time from the oxidation-reduction furnace 20 to the reaction cell 30 becomes sufficiently short. Thus, the transformation of the sulfur monoxide during the transfer is inhibited, so that the reduction in the S/N ratio in the sulfur detection and the deterioration in the selectivity of the sulfur component in the SCD are inhibited. As a result, the sulfur component in the sample can be detected with high accuracy.

[5] Other Embodiments (a) While the oxidation-reduction furnace 20 and the reaction furnace 30 are stored in the one detector casing 3C in order to shorten the gas flow path from the oxidation-reduction furnace 20 to the reaction cell 30 in the above-described embodiment, the embodiment is not limited to this. If the gas flow path from the oxidation-reduction furnace 20 to the reaction cell 30 has a length of not more than 100 cm, the oxidation-reduction furnace 20 and the reaction cell 30 may be stored in different casings. Also in this case, with the gas flow path from the oxidation-reduction furnace 20 to the reaction cell 30 having the length of not more than 100 cm, similar effects to those of the above-described embodiment can be obtained.

(b) While the example in which the component detector 3 is the SCD is described in the above-described embodiment, the component detector 3 according to this embodiment can also be applied to a Nitrogen Chemiluminescence Detector (NCD) that detects a nitrogen component in the sample.

In this case, the nitrogen component in the sample is oxidized and reduced, so that nitrogen monoxide is produced in the oxidation-reduction furnace 20. The produced nitrogen monoxide is introduced through the aforementioned transfer tube TL0 into the reaction cell 30 or directly into the reaction cell 30. This inhibits transformation of the nitrogen monoxide during the transfer of the nitrogen monoxide from the oxidation-reduction furnace 20 to the reaction cell 30. As a result, the nitrogen component in the sample can be detected with high accuracy.

It is noted that when the component detector 3 is applied to the NCD, it is determined that a specific wavelength range of light transmitted through the optical filter F of FIG. 1 includes a wavelength of light generated by reaction between ozone and nitrogen monoxide (light generated when nitrogen dioxide transits to a ground state).

(c) While the oxidation-reduction furnace 20, the reaction cell 30, the photodetector 40, the controller 50, the flow controller 60, the ozone generator 70, the scrubber 80, and the pump 90 are stored in the one detector casing 3C in the above-described embodiment, the embodiment is not limited to this. At least some of the controller 50, the flow controller 60, the ozone generator 70, the scrubber 80, and the pump 90 may be provided outside of the detector casing 3C.

[6] Correspondences between Constituent Elements in Claims and Parts in Embodiments In the following paragraphs, examples of correspondences between constituent elements in claims below and parts in the embodiments are explained. In the above-described embodiment, the gas flow path formed by the flow path forming member 21 is an example of a first flow path, the first inlet 31 of the reaction cell 30 is an example of an inlet of a reaction cell, the detector casing 3C is an example of a holding member, the downstream end 21L of the flow path forming member 21 is an example of a downstream end of the first flow path, and the gas flow path formed by the transfer tube TL0 is an example of a second flow path.

Also, the leftward DL or the rightward DR is an example of a first direction and one direction, the forward DF or the backward DB is an example of a second direction, and the right side surface sc, the left side surface sd or the upper surface se is an example of a common plane.

As each of various elements recited in the claims, various other elements having configurations or functions described in the claims can be also used.

[7] Aspects

The above-mentioned plurality of exemplary embodiments are understood as specific examples of the below-mentioned aspects by those skilled in the art.

(Item 1) A component analysis system according to one aspect may include:
a gas chromatograph having a separation column; and
a component detector, and
the component detector may include
an oxidation-reduction furnace that has a first flow path through which a gas including a sample component separated by the separation column flows, and oxidizes and reduces the sample component in the gas flowing through the first flow path,
a reaction cell that has an inlet for the gas including the reduced sample component and generates a chemical reaction accompanied by emission of light with respect to the sample component introduced from the inlet,
a photodetector that detects light generated in the reaction cell, and
a holding member that holds the oxidation-reduction furnace and the reaction cell, and
a downstream end of the first flow path and the inlet of the reaction cell may be directly connected or connected via a second flow path.

In the component analysis system, the sample component separated by the separation column is detected by the component detector. In the component detector, the oxidation-reduction furnace and the reaction cell are integrally held by the holding member and, therefore, a distance between the oxidation-reduction furnace and the reaction cell can be shortened. Thus, the downstream end of the first flow path and the inlet of the reaction cell can be directly connected to each other or connected via a second flow path having a comparatively short length. In this case, time required for the sample component to reach the reaction cell from the oxidation-reduction furnace can be shortened such that the sample component reduced in the oxidation-reduction furnace is not transformed until the reduced sample component reaches the reaction cell. Accordingly, a chemical reaction required for detection of the sample component can be stably generated in the reaction cell. As a result, the sample component separated by the separation column can be detected with high accuracy.

(Item 2) In the component analysis system according to item 1, in a case where the sample component separated by the separation column includes sulfur, the chemical reaction may be a chemical reaction in which a sulfur component reduced by the oxidation-reduction furnace is excited by ozone.

In a case where a sample includes a sulfur component, sulfur monoxide produced in the oxidation-reduction furnace reacts with ozone in the reaction cell, so that light is generated. The sulfur monoxide is likely to be transformed while being transferred to the reaction cell as compared to another compound produced due to a solvent in the oxidation-reduction furnace. However, with the above-described configuration, since the transformation of the sulfur monoxide during the transfer of the sulfur monoxide to the reaction cell is inhibited, the sulfur component in the sample can be detected with high accuracy.

(Item 3) In the component analysis system according to item 1 or 2, the oxidation-reduction furnace may be formed such that the first flow path extends in a first direction from an upstream end to the downstream end,
the reaction cell may be arranged to line up with the oxidation-reduction furnace in a second direction intersecting with the first direction, and
the downstream end of the first flow path and the inlet of the reaction cell may be connected via the second flow path.

With the above-described configuration, an increase in size of the component detector in the first direction can be inhibited.

(Item 4) In the component analysis system according to item 3, the reaction cell may be arranged such that the inlet is directed in the first direction.

With the above-described configuration, the second flow path that connects the downstream end of the first flow path and the inlet of the reaction cell can be shortened.

(Item 5) In the component analysis system according to item 4, the oxidation-reduction furnace and the reaction cell may be arranged such that the downstream end of the first flow path and the inlet of the reaction cell are positioned within a common plane orthogonal to the first direction.

In this case, the second flow path can be further shortened.

(Item 6) In the component analysis system according to item 1 or 2, the downstream end of the first flow path and the inlet of the reaction cell may be connected via the second flow path, and
the second flow path may be provided to be attachable to and detachable from the downstream end of the first flow path and the inlet of the reaction cell in an outside of the holding member.

In this case, maintenance of the oxidation-reduction furnace and the reaction cell can be carried out from the outside of the holding member by removing the second flow path from the downstream end of the first flow path and the inlet of the reaction cell in the outside of the holding member.

(Item 7) In the component analysis system according to item 1 or 2, the oxidation-reduction furnace may be formed such that the first flow path extends in one direction from the upstream end to the downstream end, and
the reaction cell may be arranged to line up with the oxidation-reduction furnace in the one direction and may be arranged such that the inlet faces the downstream end of the first flow path.

In this case, a flow path for the sample component from the oxidation-reduction furnace to the reaction cell can be further shortened.

(Item 8) In the component analysis system according to item 1 or 2, the downstream end of the first flow path and the inlet of the reaction cell may be connected via the second flow path, and a length of the second flow path may be not more than 100 cm.

Thus, the sample component reduced in the oxidation-reduction furnace is not transformed to exceed an allowable degree until the sample component reaches the reaction cell. Accordingly, the sample component separated by the separation column can be detected with high accuracy.

(Item 9) A component detector according to another aspect may be a component detector used along with a gas chromatograph having a separation column and may include:

an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, a photodetector that detects light generated in the reaction cell, and a holding member that holds the oxidation-reduction furnace and the reaction cell, and a downstream end of the first flow path and the inlet of the reaction cell may be directly connected or connected via a second flow path.

In the component detector, the oxidation-reduction furnace and the reaction cell are integrally held by the holding member and, therefore, a distance between the oxidation-reduction furnace and the reaction cell can be shortened. Thus, the downstream end of the first flow path and the inlet of the reaction cell can be directly connected to each other or connected via a second flow path having a comparatively short length. In this case, time required for the sample component to reach the reaction cell from the oxidation-reduction furnace can be shortened such that the sample component reduced in the oxidation-reduction furnace is not transformed until the reduced sample component reaches the reaction cell. Accordingly, a chemical reaction required for detection of the sample component can be stably generated in the reaction cell. As a result, the sample component separated by the separation column can be detected with high accuracy.

(Item 10) A component analysis system according to another aspect may include a gas chromatograph having a separation column, and a component detector, wherein the component detector may include an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, and a photodetector that detects light generated in the reaction cell, and a downstream end of the first flow path and the inlet of the reaction cell may be connected to each other or connected via a second flow path having a length of not more than 100 cm.

In the component analysis system, the sample component separated by the separation column is detected by the component detector. In the component detector, the downstream end of the first flow path and the inlet of the reaction cell can be directly connected to each other or connected via the second flow path having the length of not more than 100 cm. In this case, time required for the sample component to reach the reaction cell from the oxidation-reduction furnace can be shortened such that the sample component reduced in the oxidation-reduction furnace is not transformed until the reduced sample component reaches the reaction cell. Accordingly, a chemical reaction required for detection of the sample component can be stably generated in the reaction cell. As a result, the sample component separated by the separation column can be detected with high accuracy.

(Item 11) A component detector according to still another aspect may be a component detector used along with a gas chromatograph having a separation column and may include:

an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, and a photodetector that detects light generated in the reaction cell, and a downstream end of the first flow path and the inlet of the reaction cell may be connected to each other or connected via a second flow path having a length of not more than 100 cm.

In the component detector, the downstream end of the first flow path and the inlet of the reaction cell are connected to each other or connected via the second flow path having the length of not more than 100 cm. In this case, time required for the sample component to reach the reaction cell from the oxidation-reduction furnace can be shortened such that the sample component reduced in the oxidation-reduction furnace is not transformed until the reduced sample component reaches the reaction cell. Accordingly, a chemical reaction required for detection of the sample component can be stably generated in the reaction cell. As a result, the sample component separated by the separation column can be detected with high accuracy.

The invention claimed is:

1. A component analysis system comprising:
a gas chromatograph having a separation column; and
a component detector,
the component detector including an oxidation-reduction furnace that has a first flow path through which a gas including a sample component separated by the separation column flows, and oxidizes and reduces the sample component in the gas flowing through the first flow path,
a reaction cell that has an inlet for the gas including the reduced sample component and generates a chemical reaction accompanied by emission of light with respect to the sample component introduced from the inlet, a photodetector that detects light generated in the reaction cell, and a detector casing that stores the oxidation-reduction furnace and the reaction cell, wherein a downstream end of the first flow path and the inlet of the reaction cell are connected via a second flow path, the oxidation-reduction furnace and the reaction cell are held by the detector casing, and the second flow path is provided outside of the detector casing and is attachable to and detachable from a downstream end of the oxidation-reduction furnace and the inlet of the reaction cell.

2. The component analysis system according to claim 1, further comprising an ozone generator, wherein the sample component separated by the separation column includes sulfur, and a sulfur component reduced by the oxidation-reduction furnace is excited by ozone generated by the ozone generator.

3. The component analysis system according to claim 1, wherein the oxidation-reduction furnace is formed such that the first flow path extends in a first direction from an upstream end to the downstream end, at least a part of the reaction cell is arranged to line up with the oxidation-reduction furnace in a second direction intersecting with the first direction, and the downstream end of the first flow path and the inlet of the reaction cell are connected via the second flow path.

4. The component analysis system according to claim 3, wherein the reaction cell is arranged such that the inlet is directed in the first direction.

5. The component analysis system according to claim 4, wherein the oxidation-reduction furnace and the reaction cell are arranged such that the downstream end of the first flow path and the inlet of the reaction cell are positioned within a common plane orthogonal to the first direction.

6. The component analysis system according to claim 1, a length of the second flow path is not more than 100 cm.

7. A component detector used along with a gas chromatograph having a separation column, the component detector comprising:

an oxidation-reduction furnace that has a first flow path through which a gas including a sample component separated by the separation column flows, and oxidizes and reduces the sample component in the gas flowing through the first flow path;

a reaction cell that has an inlet for the gas including the reduced sample component and generates a chemical reaction accompanied by emission of light with respect to the sample component introduced from the inlet;

a photodetector that detects light generated in the reaction cell; and a detector casing that stores the oxidation-reduction furnace and the reaction cell, wherein a downstream end of the first flow path and the inlet of the reaction cell are connected via a second flow path, the oxidation-reduction furnace and the reaction cell are held by the detector casing, and the second flow path is provided outside of the detector casing and is attachable to and detachable from a downstream end of the oxidation-reduction furnace and the inlet of the reaction cell.

8. A component analysis system comprising:

a gas chromatograph having a separation column; and a component detector, the component detector including an oxidation-reduction furnace that has a first flow path through which a gas including a sample component separated by the separation column flows, and oxidizes and reduces the sample component in the gas flowing through the first flow path, a reaction cell that has an inlet for the gas including the reduced sample component and generates a chemical reaction accompanied by emission of light with respect to the sample component introduced from the inlet, a photodetector that detects light generated in the reaction cell, and a detector casing that stores the oxidation-reduction furnace and the reaction cell, wherein a lower end surface of the oxidation-reduction furnace and an upper end surface of the reaction cell are in direct contact with each other, and the oxidation-reduction furnace and the reaction cell are held by the detector casing.

* * * * *